US008185717B2

(12) United States Patent
Ableidinger (10) Patent No.: US 8,185,717 B2
(45) Date of Patent: May 22, 2012

(54) APPARATUS AND METHOD FOR PROFILING SOFTWARE PERFORMANCE ON A PROCESSOR WITH NON-UNIQUE VIRTUAL ADDRESSES

(75) Inventor: Bruce J. Ableidinger, Portland, OR (US)

(73) Assignee: MIPS Technologies, Inc., Sunnyvale, CA (US)

( * ) Notice: Subject to any disclaimer, the term of this patent is extended or adjusted under 35 U.S.C. 154(b) by 492 days.

(21) Appl. No.: 12/506,153

(22) Filed: Jul. 20, 2009

(65) Prior Publication Data

US 2011/0016289 A1  Jan. 20, 2011

(51) Int. Cl.
*G06F 12/08* (2006.01)
(52) U.S. Cl. .......... 711/203; 711/108; 711/216; 714/53; 714/718
(58) Field of Classification Search .................. 711/108, 711/203, 216; 714/53, 718
See application file for complete search history.

(56) References Cited

U.S. PATENT DOCUMENTS

| 4,860,195 A * | 8/1989 | Krauskopf ..................... 711/202 |
| 7,844,862 B1 * | 11/2010 | Grove et al. .................. 714/47.1 |
| 2002/0188831 A1 * | 12/2002 | Jackson et al. ................ 712/227 |
| 2005/0033766 A1 * | 2/2005 | Pang et al. .................. 707/104.1 |
| 2007/0074074 A1 * | 3/2007 | Curtis et al. ..................... 714/25 |
| 2011/0016289 A1 * | 1/2011 | Ableidinger .................. 711/206 |

* cited by examiner

*Primary Examiner* — Jae Yu
(74) *Attorney, Agent, or Firm* — Cooley LLP (57) ABSTRACT

A system includes a processor with a memory map specifying a user mode region with virtual address translation by a memory management unit and a kernel mode region with direct virtual address translation. The processor executes an application in the user mode region where virtual addresses are not unique. A probe receives trace information from the processor. A host system receives the trace information from the probe. The host system includes a data structure associating a process name, a process identification and a set of instruction counters. Each instruction counter is incremented upon the processing of a designated virtual address within the trace information. A profiling module processes information associated with the process name and set of instruction counters to identify a performance problem in the application.

20 Claims, 6 Drawing Sheets

APPARATUS AND METHOD FOR PROFILING SOFTWARE PERFORMANCE ON A PROCESSOR WITH NON-UNIQUE VIRTUAL ADDRESSES

FIELD OF THE INVENTION

This invention relates generally to monitoring performance problems in processors. More particularly, this invention relates to profiling software performance on a processor that executes an application in a memory space in which virtual addresses are not unique.

BACKGROUND OF THE INVENTION

Figure 1:
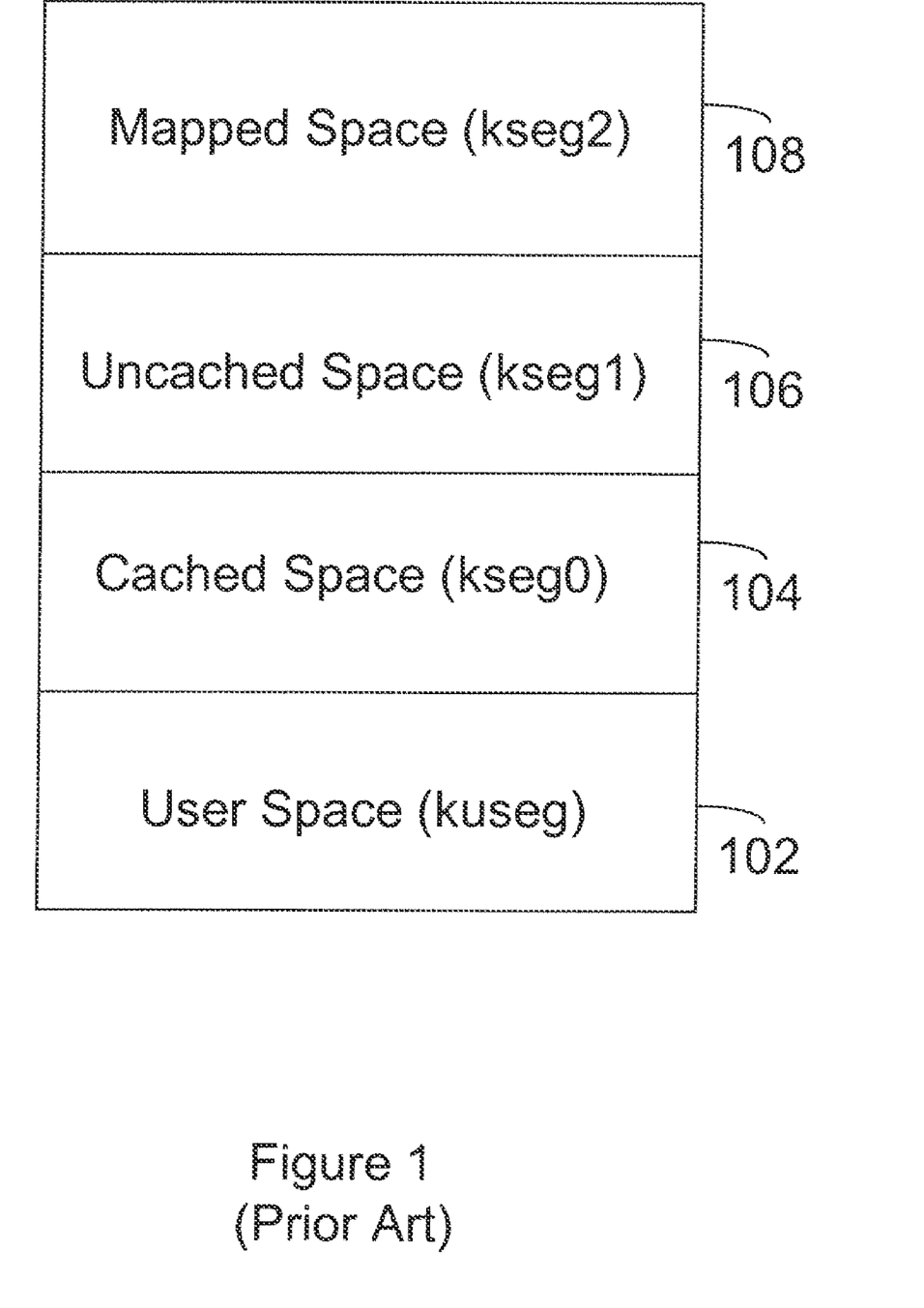
FIG. 1 illustrates a prior art processor with a user mode memory mapped region and a kernel mode memory mapped region.

Processors sold by MIPS Technologies™, Sunnyvale, Calif., use and handle addresses differently than traditional Complex Instruction Set Computer (CISC) CPUs. FIG. 1 illustrates a MIPS memory map for a 32-bit processor. The memory map includes a user mode region 102 and kernel mode regions 104, 106 and 108. More specifically, the memory map includes a user space region called "kuseg" 102. The user space region is a 2 GB region spanning virtual addresses 0x0000 0000 through 7FFF FFFF. These addresses are translated by a Memory Management Unit (MMU).

For the kernel mode, there is an unmapped cached region called "kseg0" 104. This region is 512 MB ranging from virtual address 0x8000 000 through 9FFF FFFF. These virtual addresses are translated into physical addresses by merely stripping off the top bit and mapping them contiguously into the lower 512 MB of physical memory. Addresses in this region are almost always accessed through the cache. The addresses are used for most programs and data in systems not using an MMU and are used by the Operating System (OS) kernel for systems that do use an MMU.

The unmapped uncached region is called "kseg1" 106. This region is also 512 MB, with virtual addresses ranging from 0xA000 0000 through BFFF FFFF. These virtual addresses are also mapped into physical addresses by stripping off the leading 3 bits, giving a duplicate mapping of the lower 512 MB of physical memory. In this space, access does not rely upon the cache.

The mapped region is called "kseg2" 108. This 1 GB region spans virtual addresses 0xC000 0000 through FFFF FFFF. This area is only accessible in kernel mode. This region is translated through the MMU.

The Linux operating system is loaded into the kseg0 memory region, which is directly mapped virtual-to-physical memory. Linux loadable modules, primarily installed as device drivers, are loaded into the kseg2 memory region, which is mapped via the MMU. Neither kseg0 nor kseg2 uses Address Space Identifier (ASID) mappings.

In the kuseg region, applications written for the Linux operating system are dynamically loaded. The MMU uses the 8-bit ASID to support up to 256 mapped memory regions (applications) via the TLB hardware system. Each application resides in the same virtual address space (0x0 to 0x7FFFFFFF) and the ASID in a sense extends the address space by 8 additional bits. Beyond 256 different applications (also called processes) the operating system must reuse ASIDs. In particular, Linux does not limit the number of processes to 256. Therefore, it must use a software ID with more than 8 bits. The PID—or process identification (ID)—is used for this purpose. The PID is a 32 bit word.

When the OS sets up an application process and its memory allocation, it assigns it a PID and a mapping to the hardware ASID; these are maintained in a table in OS memory space. When the OS performs a context switch to allow a different process to have CPU time, it sometimes has to remap the ASID assignment to the process. Thus, the PID-to-ASID mapping is not static per process; that is, it is possible for the ASID of a process to change while that process exists. Consequently, virtual addresses alone are not unique in this memory space.

For the purpose of measuring the performance of executing software on a processor using address sampling, it is important to profile the relative time spent executing code at the most detailed sampling level—on per-instruction address granularity for one or more application processes. Since all processes in the user mode space share the same virtual address space, the sampling process must somehow uniquely identify the process that is actively executing so that there are separate sampling bin sets maintained for each process. Again, this issue does not arise in the kernel mode region because there is a direct mapping to physical addresses without regard to the ASID. Therefore, it would be desirable to profile Linux applications in the user mode region where sampled virtual addresses are not unique.

SUMMARY OF THE INVENTION

The invention includes a system with a processor with a memory map specifying a user mode region with virtual address translation by a memory management unit and a kernel mode region with direct virtual address translation. The processor executes an application in the user mode region where virtual addresses are not unique to each process. A probe receives trace information from the processor. The trace information may be actively sampled executed virtual addresses or executed trace information. A host system receives the trace information from the probe. The host system includes a data structure associating a process name, a process identification (PID) and a set of instruction counters. Each instruction counter is incremented upon the processing of a designated address within the trace information. The designated address may be a sampled or traced virtual address. A profile module processes information associated with the process name, process identification and set of instruction counters to identify a performance problem in the application.

A method of the invention includes receiving trace information from a processor executing an application in a memory space in which virtual addresses are not unique. The trace information including a virtual address and corresponding application space identifier (ASID) is associated with a process name, a process identification and a set of instruction counters. An instruction counter associated with the virtual address is incremented. Information associated with the process name, process identification and set of instruction counters is processed to identify a performance problem in the application.

The invention also includes a computer readable storage medium with executable instructions to receive trace information from a processor executing an application in a memory space in which virtual addresses are not unique. Trace information including a virtual address is associated with a process name, a process identification and a set of instruction counters. An instruction counter associated with the virtual address is incremented. Information associated with the process name, process identification and set of instruction counters is processed to identify a performance problem in the application.

The invention also includes a computer with a central processing unit and an interface connected to the central processing unit. The interface receives trace information from a hardware debug probe connected to a processor executing an application in a memory space in which virtual addresses are not unique. A memory is connected to the central processing unit. The memory stores a profiling module that associates process identification values, process names and instruction counters. The profiling module identifies a performance problem in the application by evaluating the process identification values, process names and instruction counters.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 2:
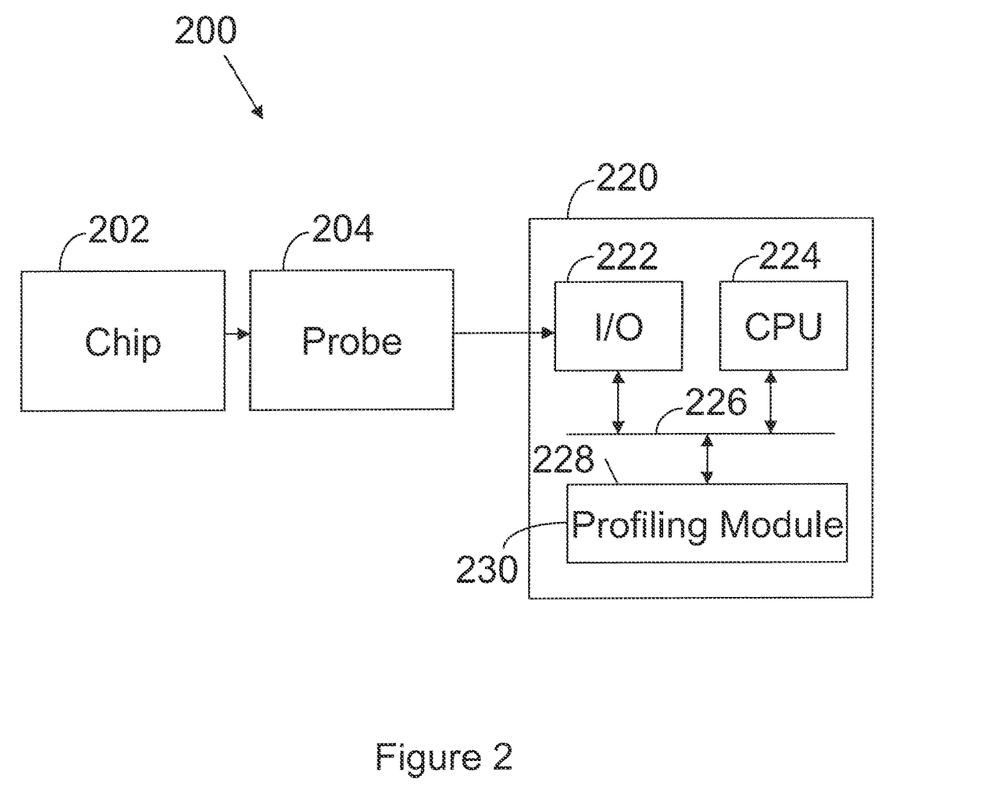
FIG. 2 illustrates a system configured in accordance with an embodiment of the invention.

FIG. 2 illustrates a system 200 configured in accordance with an embodiment of the invention. The system 200 includes a chip 202 with a JTAG interface. The chip 202 includes a memory space in which virtual addresses are not unique.

A probe 204 receives trace information from the chip 202 and conveys it to a computer 220. As used herein, trace information refers to sampled data or real-time trace data (where it is stored and then post-processed). The probe 204 may perform initial processing on the trace information, temporarily store selected trace information and perform other probe operations known in the art. In one embodiment, the probe 204 accumulates and streams trace information to a computer 220. In an alternate embodiment, the probe 204 includes an embedded processor, associated RAM and input/output to perform the operations described in connection with computer 220.

The computer 220 includes standard components, such as input/output devices 222 connected to a central processing unit 224 via a bus 226. A memory 228 is also connected to the bus 226. The memory 228 includes a profiling module 230, which includes executable instructions to profile trace information. The profiling module 230 includes executable instructions to provide dynamic measurements of target program execution (i.e., a program executing on chip 202). The chip 202 latches the PC (program counter) of each retired instruction. The PC includes a virtual address and an ASID. The JTAG scanning hardware samples this PC periodically and shifts the value into JTAG probe memory; these are accumulated then streamed to the host PC 220 where each sampled address is counted. The profiling module 230 accumulates the counts in each "bin" of target addresses in ranges as defined by program symbols. The "bins" are also referred to herein as instruction counters. Symbols are maintained at a hierarchy of granularity: the largest is modules—a group of contiguous functions compiled from a single file, functions, source line numbers generated by the compiler for each module, and each instruction as defined by the sampled virtual addresses.

Figure 3:
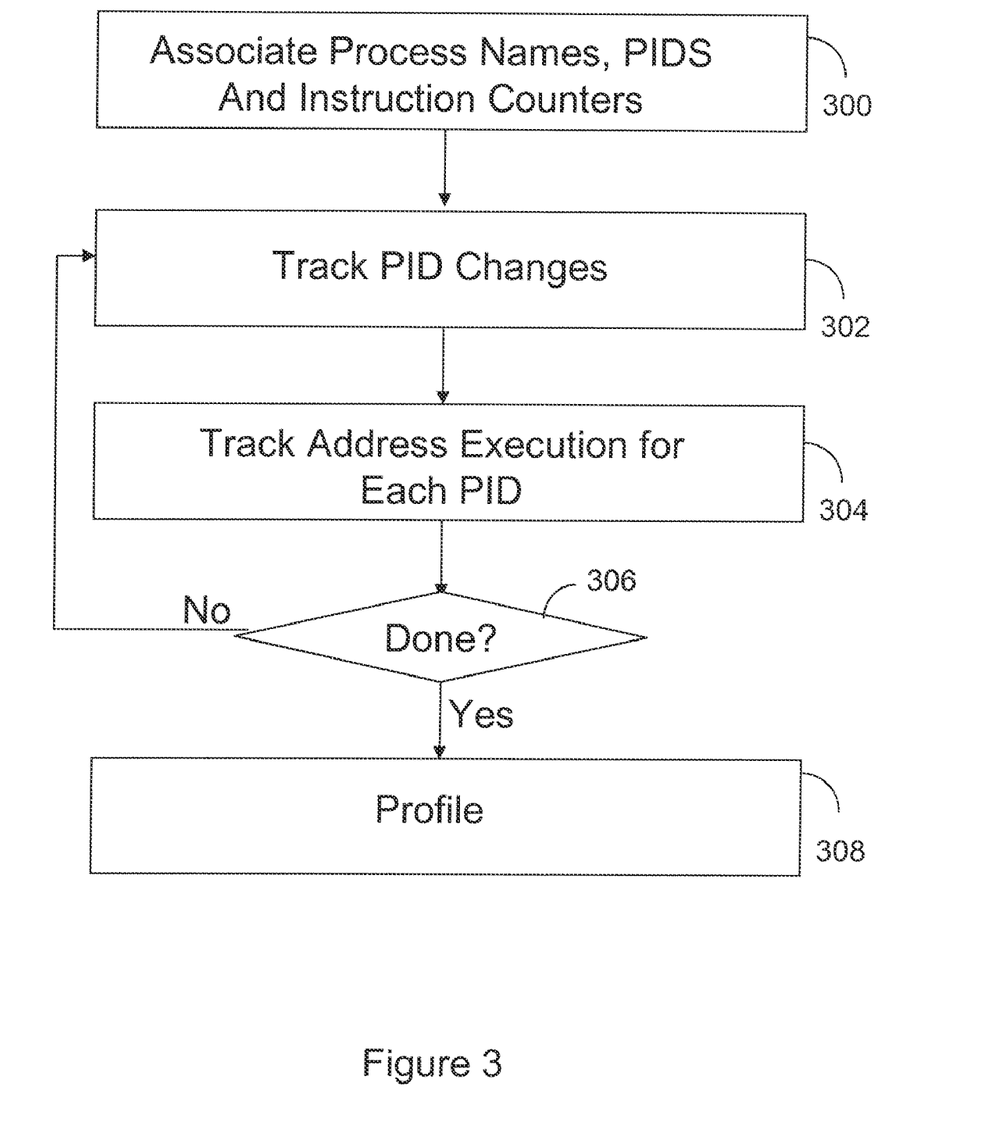
FIG. 3 illustrates processing operations associated with an embodiment of the invention.
Figure 4:
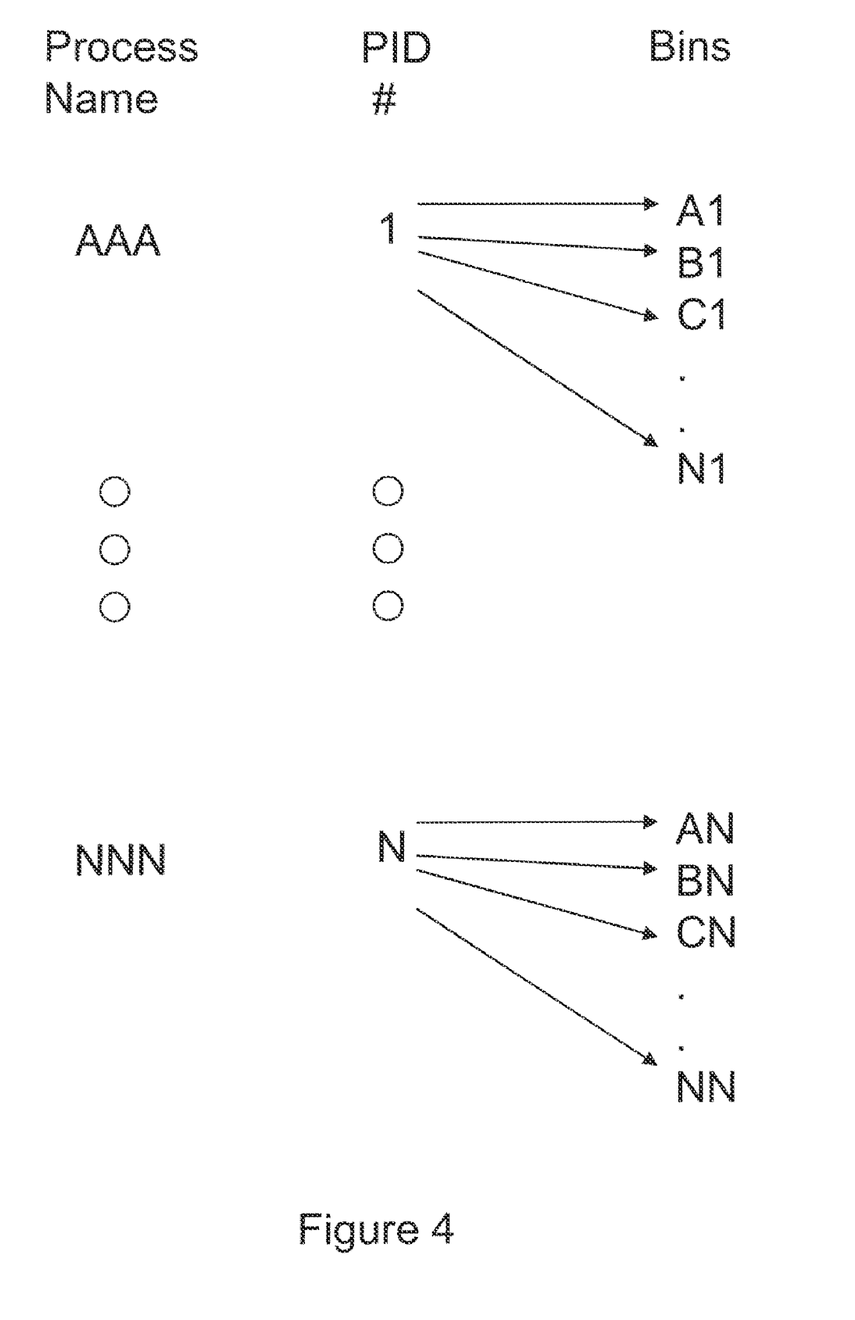
FIG. 4 illustrates a profiling module data structure utilized in accordance with an embodiment of the invention.

FIG. 3 illustrates processing operations associated with an embodiment of the profiling module 230. The profiling module 230 includes executable instructions and a data structure to associate process names, PIDS and instruction counters 300. FIG. 4 illustrates an exemplary data structure for this purpose. A process of an application executing on chip 202 is designated by name (e.g., AAA). This name is associated with a PID number (e.g., 1). In turn, the PID number is associated with a set of bins (A1 through N1). Each bin is an instruction counter that is incremented when an instruction with the physical address corresponding to the bin is executed. Translation Look-aside Buffer or page table mappings are used to map a virtual address associated with a PID to a physical address. This structure is repeated for each process name, PID and associated set of bins.

Returning to FIG. 2, the profiling module 230 tracks PID changes 302. In particular, the profiling module 230 tracks PID changes generated by the chip 202, which are passed to the probe 204 and ultimately to the profiling module 230. For each PID, address execution is tracked 304. That is, each retired instruction is counted in a bin associated with the instruction. In this way, activity is tracked at the process level and the instruction level. The processing is repeated until the application is completed. When the application is completed (Done—YES) 306, profile operations are performed 308. The profiling module 230 includes executable instructions to process the process name and instruction counters to identify a performance problem in the application. Profiling may commence before the application is completed. Binned data may be immediately processed and results may be displayed thereafter. For example, in a multi-threaded application, samples can be accumulated, processed and displayed. The processing may include counts for each symbol address range, a total count and the percentage of total time for each symbol. When the application is completed, the results may be sorted and presented from the highest percentage to the lowest percentage.

Observe that the profiling module requires the processing of operating system kernel state information. In particular, the operating system kernel passes PID change information in this embodiment. In one embodiment, when the Linux kernel scheduler switches applications, just before the context switch is made, the kernel sends the PID value to the profiling module 230. The profiling module 230 looks up the PID in the data structure of FIG. 4 and switches its index to the set of sampling bins allocated for that PID.

PIDs and process names may be determined through a console command or separate query over the same channel that the PIDs are sent to the profiling module 230. The user, via command or a GUI and prior to running the profiling module 230, selects which process or processes are to be measured. This information is added to the indexing table. If a process is not to be profiled, the software does not run PC sampling until the target state changes to a process that is being profiled.

PC samples include the 32-bit virtual address and the 8-bit ASID. For the embodiment of FIG. 3, the profiling module 230 ignores the ASID and only indexes the process bins with the PID updated from the kernel. The advantage of this approach is that the profiling module 230 is relatively simple to implement. The disadvantage of this embodiment is that the PIDs may change on the order of a 100 times per second so the communications channel from chip 202 to host 220 must support this data rate.

Figure 5:
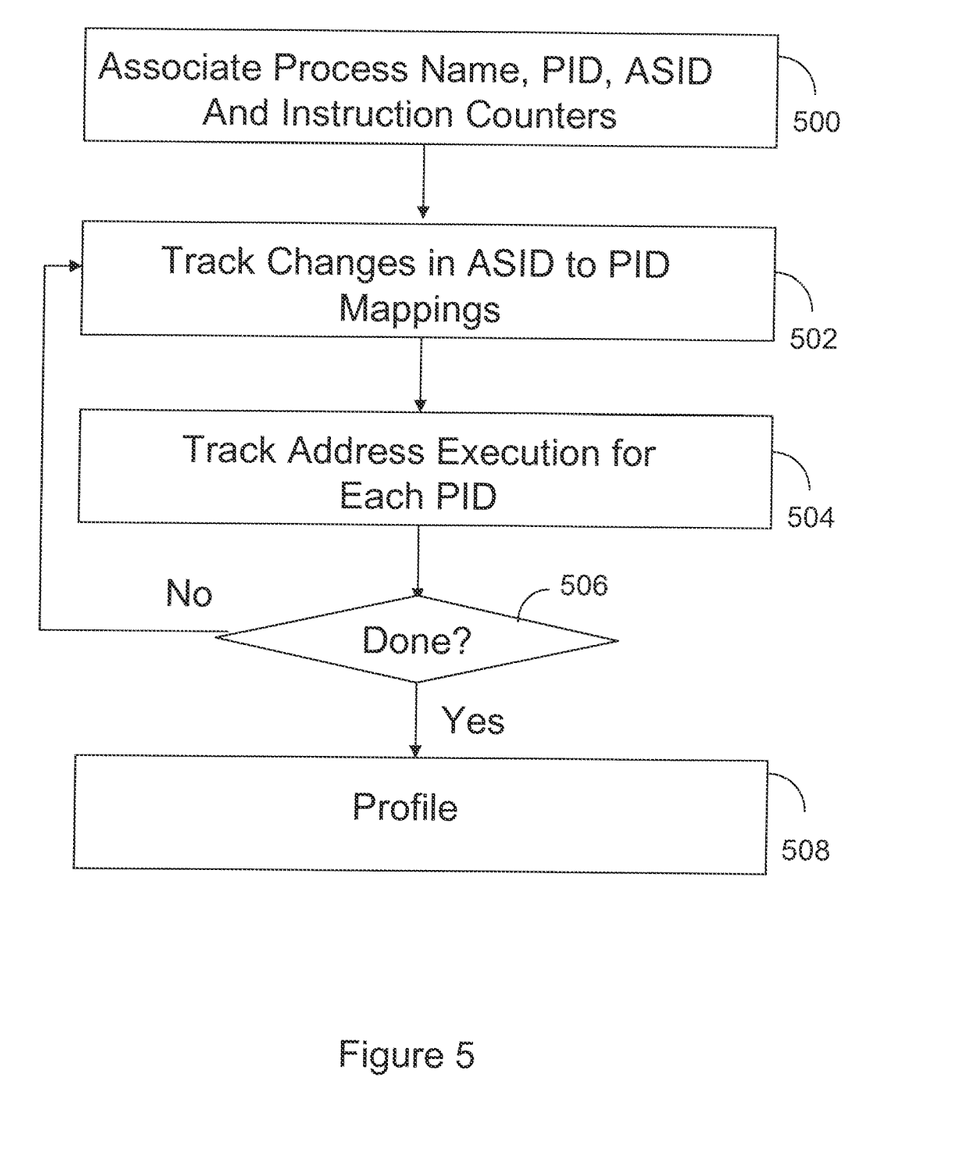
FIG. 5 illustrates processing operations associated with an alternate embodiment of the invention.
Figure 6:
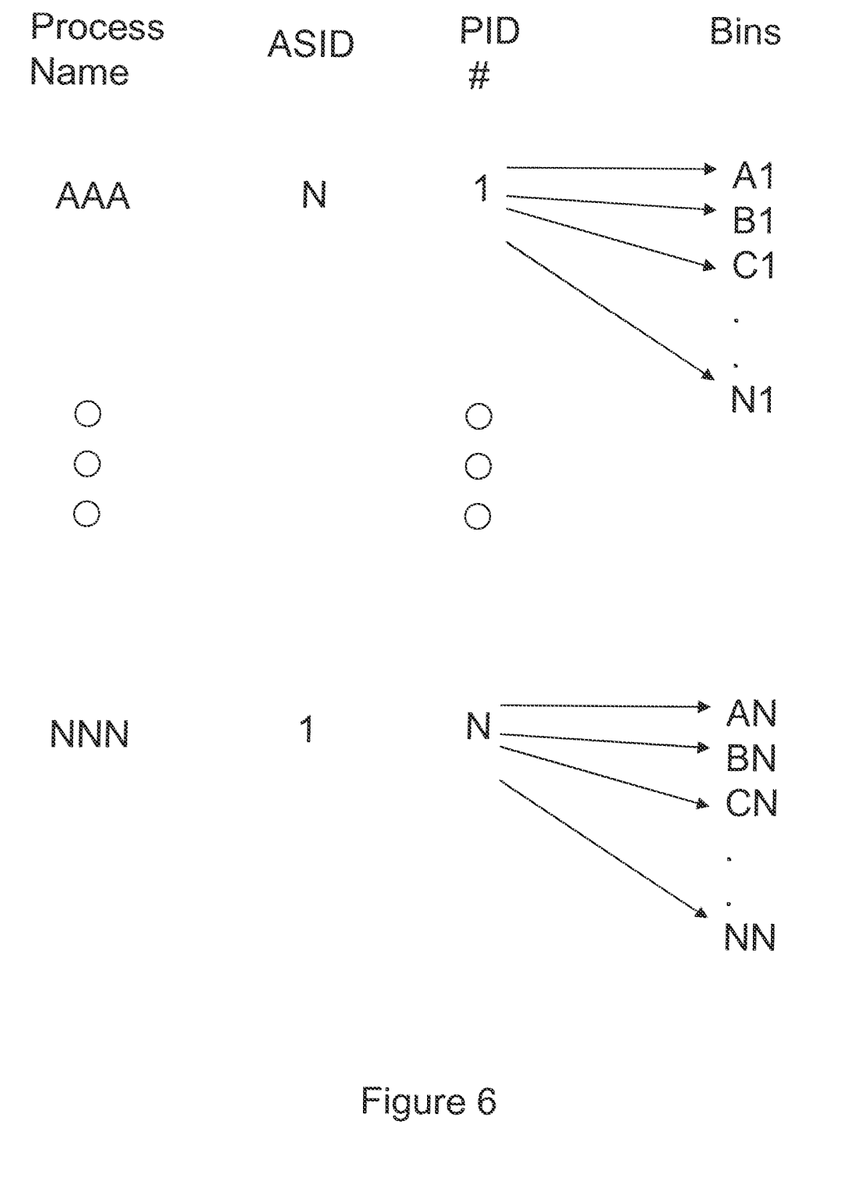
FIG. 6 illustrates a profiling module data structure utilized in accordance with an embodiment of the invention.

FIG. 5 illustrates an alternate embodiment of the profiling module 230. In this embodiment, the profiling module 230 associates a process name, PID, ASID and instruction counters 500. A data structure to implement this operation is shown in FIG. 6. Next, the profiling module 230 tracks changes in ASID to PID mappings 502. Recall that the ASID value only supports 256 processes. Therefore, the association between an ASID and a PID may be dynamically altered when more than 256 processes are being executed.

For each ASID to PID mapping, address execution is tracked 504. That is, a bin or instruction counter is incremented when a specified address corresponding to a bin is retired. This process is repeated until the application has terminated processing (Done—YES) 506. Profiling operations are then performed 508. In particular, the profiling module 230 utilizes executable instructions to process the process name and instruction counters to identify a performance problem in the application.

In this embodiment, the profiling module 230 starts with an initial list of process IDs, process names, and the ASIDs assigned to the PID. This table can be populated via a command from the profiling module 230 to chip 202. Alternately, a separate communication channel can be used to issue such a command.

Recall that each PC sample includes a virtual address and 8-bit ASID. When the virtual address is determined to be in kuseg space (<0x80000000), the ASID is used to index into the structure of FIG. 6. The table points to the set of bins set up to profile that process. In one embodiment, the Linux kernel is instrumented to send update information to the profiling module 230 when 1) the ASID-PID mapping is changed, 2) a PID process has been terminated, and 3) a new process has been created with new ASID-PID values.

The PID is located in the table and its ASID is updated to a new value. The indexing to the profiling bins is unaltered. If the new ASID was already in use, the PID and indexing information is saved so that a new ASID assignment to that PID can be looked up.

When a PID is terminated, the user must determine (apriori) if the sampling data for that process should be saved or destroyed. In most embedded systems that are being profiled, the process stays alive during the measurement so this is unlikely to occur.

The profiling module incrementally handles new processes that are created. This triggers the update of any views that display all current processes. The view in turn provides a means for the user to select which processes to profile. This could also be accommodated via tool commands.

The advantage of this implementation is that the rate of change of ASID-PID mappings is much lower than the change of the active PID—perhaps 10's per second or less.

While the invention has been disclosed in connection with a 32-bit addressing mode, the concepts of the invention are equally applicable to other addressing modes, such as 64-bit processor cores.

While various embodiments of the invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.).

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments but should be defined only in accordance with the following claims and their equivalents.

The invention claimed is:

1. A system, comprising:
a processor with a memory map specifying a user mode region with virtual address translation by a memory management unit and a kernel mode region with direct virtual address translation, wherein the processor executes an application in the user mode region, where virtual addresses are not unique;
a probe to receive trace information from the processor; and
a host system to receive the trace information from the probe, wherein the host system includes:
a data structure associating a process name, a process identification and a set of instruction counters, each instruction counter being incremented upon the processing of a designated virtual address within the trace information;
a profiling module to process information associated with the process name and set of instruction counters to identify a performance problem in the application.

2. The system of claim 1 wherein the trace information includes virtual addresses and associated application space identifiers for the application executed by the processor.

3. The system of claim 1, wherein the profiling module includes executable instructions to receive process identification information from an operating system executed by the processor.

4. The system of claim 3, wherein the profiling module includes executable instructions to receive from the operating system mappings between application space identifiers and process identifications.

5. The system of claim 1, wherein the profiling module tracks a change in process identification.

6. The system of claim 1, wherein the profiling module tracks a change in mapping between an application space identifier and a process identification.

7. A method executed on a computer, comprising:
receiving trace information from a processor executing an application in a memory space in which virtual addresses are not unique;

associating trace information including a virtual address with a process name, a process identification and a set of instruction counters;

incrementing an instruction counter associated with the virtual address;

processing information associated with the process name and set of instruction counters to identify a performance problem in the application.

8. The method of claim 7 further comprising retrieving process identification information from an operating system executed by the processor.

9. The method of claim 8 further comprising receiving from the operating system mappings between application space identifiers and process identifications.

10. The method of claim 7 further comprising passing information about a change in process identification to a profiling module.

11. The method of claim 7 further comprising passing information about a change in mapping between an application space identifier and a process identification to a profiling module.

12. A computer readable storage medium, comprising executable instructions to:

receive trace information from a processor executing an application in a memory space in which virtual addresses are not unique;

associate trace information including a virtual address with a process name, a process identification and a set of instruction counters;

increment an instruction counter associated with the virtual address;

process information associated with the process name and set of instruction counters to identify a performance problem in the application.

13. The computer readable storage medium of claim 12 further comprising executable instructions to receive process identification information from an operating system executed by the processor.

14. The computer readable storage medium of claim 13 further comprising executable instructions to receive mappings between application space identifiers and process identifications.

15. The computer readable storage medium of claim 12 further comprising executable instructions to receive information about a change in process identification.

16. The computer readable storage medium of claim 12 further comprising executable instructions to receive information about a change in mapping between an application space identifier and a process identification.

17. A computer, comprising:

a central processing unit;

an interface connected to the central processing unit, the interface receiving trace information from a probe connected to a processor executing an application in a memory space in which virtual addresses are not unique; and a memory connected to the central processing unit, the memory storing a profiling module associating process identification values, process names and instruction counters, wherein the profiling module identifies a performance problem in the application by evaluating the process identification values and instruction counters.

18. The computer of claim 17 wherein the profiling module tracks changes in process identification values.

19. The computer of claim 17 wherein the profiling module tracks changes in mappings between process identification values and application space identification values.

20. The computer of claim 17 wherein the profiling module increments designated instruction counters after execution by the processor of designated instructions.

* * * * *